D. H. HAYWOOD.
REGULATING APPARATUS.
APPLICATION FILED JAN. 15, 1907.

905,425.

Patented Dec. 1, 1908.

WITNESSES:

INVENTOR

BY

ATTORNEYS

D. H. HAYWOOD.
REGULATING APPARATUS.
APPLICATION FILED JAN. 15, 1907.

905,425.

Patented Dec. 1, 1908.

WITNESSES:

INVENTOR

ATTORNEYS

UNITED STATES PATENT OFFICE.

DANIEL HOWARD HAYWOOD, OF NEW YORK, N. Y.

REGULATING APPARATUS.

No. 905,425.          Specification of Letters Patent.          Patented Dec. 1, 1908.

Application filed January 15, 1907. Serial No. 352,373.

*To all whom it may concern:*

Be it known that I, DANIEL HOWARD HAYWOOD, a citizen of the United States of America, and resident of New York, county and State of New York, have invented certain new and useful Improvements in Regulating Apparatus, of which the following is a specification, reference being had to the accompanying drawings, forming a part thereof.

My invention relates to heat regulating apparatus, and particularly to heat regulating means controlled initially by a thermostat. In the particular class of apparatus I have reference to, the thermostat controls the operation of a minute air valve, the movement of which either directly or indirectly controls the supply and waste of motive fluid to and from the fluid pressure motor of a main valve. To attain the required delicacy in the thermostat, the movement thereof, and hence the movement of the valve controlled thereby, must necessarily be minute, hence but minute quantities of motive fluid will be permitted to pass the said valve when the same is operated for the purpose of supplying motive fluid to the fluid pressure motor or otherwise. But where steam is employed for heating purposes it is undesirable that the main controlling valve therefor shall work slowly; particularly is it undesirable that the said main heat regulating valve shall open slowly. One of the main reasons for this is that, by admitting a very small quantity of steam at a time to a cold radiator, the steam is permitted to condense, and continues to condense as it continues to be admitted, until finally the radiator, and indeed a large portion of the heating system, fills up with water. Many attempts have been made to obviate this, and to compel a quick and positive movement of the heat regulating valve following exceedingly minute movements of the thermostat. Relay systems are an example of this, in which a relay is interposed between the thermostatically controlled valve and the main valve and motor, such relay consisting of a secondary valve and secondary motor therefor, the secondary motor controlled by movements of the thermostatic valve, the secondary valve operated by the secondary motor, and the main valve motor operated upon movements of the secondary motor and valve. Such system, however, has proved quite unsatisfactory in the past for many reasons, an important one of which is that in such case the thermostatically controlled valve, instead of operating directly in connection with the motor for the main valve, operates in connection with the secondary motor, and the main motor is not operated until after the movement of the secondary valve. The control of the main valve is hence indirect instead of direct, whereby there arises a greater tendency to inaccuracy, and the operation of the main valve is retarded with respect to the time the thermostatically controlled valve is moved, to such an extent as to seriously impair the efficiency of the device, that is to say, the temperature may fall considerably above or below a predetermined point before the main valve is caused to operate, while the ideal condition is, of course, the operation of the main valve in one direction or the other immediately the temperature rises to any extent above or below a predetermined point. Moreover, the addition of relay mechanism only partially meets the difficulty, because the relay itself is apt to work slowly, and may hang in a partially operated condition, whereby the same state of things is liable to occur as if there were no relay, that is to say, the motive fluid may be admitted or exhausted so slowly as to produce just the effect it is most desired to avoid. Still further, the addition of relay mechanism tends to complicate the structure and add moving parts of the character likely to get out of order and which require constant attention to keep them working properly.

To meet and overcome these and other difficulties in a system of this kind, I have devised an apparatus in which the thermostat directly controls the main valve, in that it initially controls movement of the motor thereof, and I have provided means operated by the motor itself in its first movement to cause the rapid completion of such movement in whichever direction it has been started. By this I obtain all the benefits of the direct control of the main valve from the thermostat without the intervention of relay means, but I compel the quick and positive movement of the main valve directly it has started either to open or close. Thus an intermediate position of the main valve, that is to say, any position thereof between the extreme open and extreme closed positions, is impossible. The said means in the preferred form of my invention comprises a valve mechanism, including auxiliary inlet and exhaust valves, both said valves closed when the motor is in a rest position at either end of its stroke, but one of the said valves being arranged to be operated by the motor when moving in one direction, and the other by the said motor, when it moves in the other direction.

In order that my invention may be fully understood, I will now proceed to describe an embodiment thereof, having reference to the accompanying drawings illustrating same, and will then point out the novel features in claims.

The heating system is represented in the drawings by a radiator 10, 11 designating the main valve therefor, 12 the fluid pressure motor for the main valve, and 13 the thermostatic means and valve mechanism in connection therewith.

14 designates a conduit which constitutes a main and constant source of supply of fluid under pressure, 15 designating the conduit which leads from the thermostat to the fluid pressure motor 12.

Figure 1:
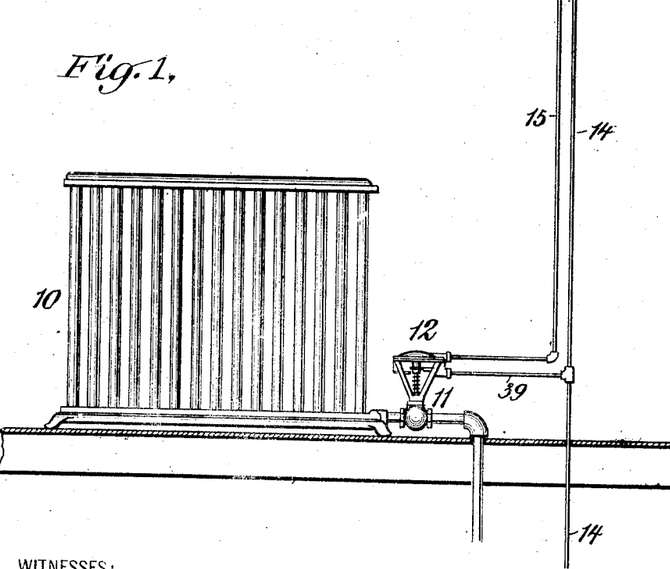
Figure 1 is a general view of the heat regulating apparatus.
Figure 2:
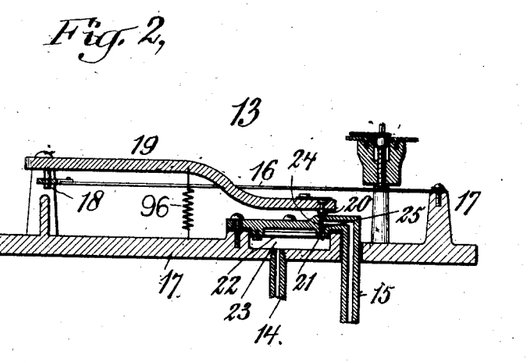
Fig. 2 is a detail sectional view of the thermostatic mechanism.

The thermostat may be of any desired construction, the form herein being the well known Davis & Roesch thermostat described and claimed in United States Letters Patent No. 704,115 and dated July 8, 1902. Said thermostat, which appears on an enlarged scale in Fig. 2, comprises a thermostatic strip 16 secured at one end to a base 17, and at the other end to a stud 18, which is mounted upon a pivoted lever 19, the end of which carries a valve 20. Another valve 21 is mounted upon a spring 22 within a chamber 23, the main supply conduit 14 connecting with said member. The valves 20 and 21 are arranged opposite each other, being separated by means of a stem 24, the length of which is just sufficient so that when the valve 20 is closed firmly to its seat, the valve 21 will be open. The stem 24 is arranged in a passage 25, which connects with the conduit 15, and is disposed between the said valves 15, and is disposed between the said valves so that the lever 19 carrying the valve 20 may be moved outward as far as is desired after the valve 21 has shut down to its seat. A spring 96 tends to pull the lever 19 downward, and is of a strength sufficient to more than overcome the resilience of the spring 22 and its tendency to close the valve 21 to its seat.

The operation of the thermostat is as follows: Air under pressure is constantly supplied to the chamber 23, but will not be allowed to pass the valve 21 so long as the said valve is closed. The valve 21 will be opened when the temperature rises sufficiently to cause the thermostatic strip 16 to expand, whereby the spring 26 will force the lever 19 downward so as to close the valve 20 and open the valve 21. Then air will flow from the chamber 23 through the conduit 15. When the temperature again falls so that the strip 16 contracts, the lever 19 will be lifted to cause the valve 21 to be closed and the valve 20 opened. This will open the conduit 15 to atmosphere while closing it to supply. In the latter condition the conduit will act as a discharge passage to discharge motive fluid from the fluid pressure motor 12, as will now be explained.

Figures 3, 4:
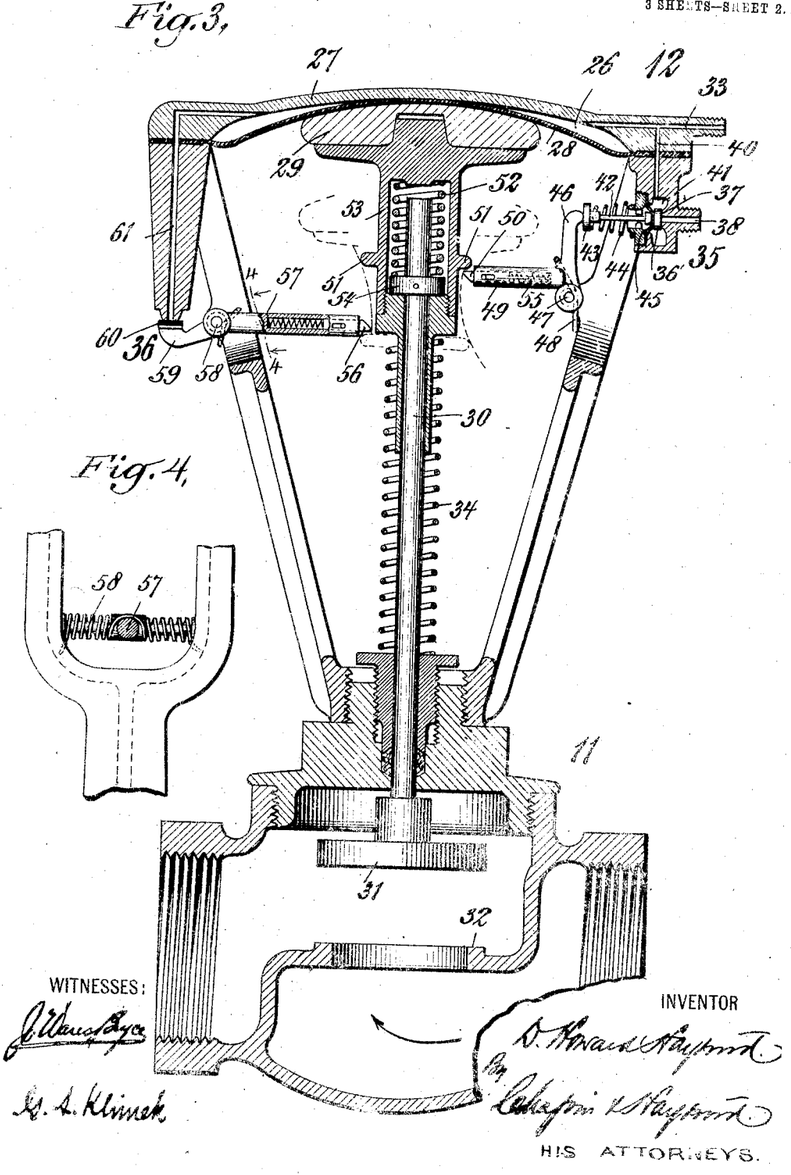
Fig. 3 is a view in central vertical section through the main valve and fluid pressure motor therefor, showing also the supplementary valve mechanism operated by the motor in its movement.
Fig. 4 is a detail view at right angles thereto of certain parts in connection with the supplemental exhaust valve, the section being taken upon the line 4—4 of Fig. 3.

Referring more particularly to Figs. 3 and 4 of the drawings, the motor 12 will be seen to comprise a fluid pressure chamber 26, having a stationary wall 27, and a movable wall 28 in the form of a flexible diaphragm, such diaphragm supported by an abutment 29. The said abutment 29 is mounted upon the valve stem 30 of a valve plug 31 employed in combination with the valve seat 32 of the part designated as a whole by the reference character 11, and previously referred to as the main valve. The conduit 15 connects with a passage 33 which leads to the interior of the chamber 26, whereby it will be seen that, as motive fluid is admitted through the conduit 15, said motive fluid will enter the chamber 26 through the passage 33, and will act upon the diaphragm 28 and abutment 29 to close the valve 31 against its seat 32. The valve 31 will be held closed to its seat for so long a time as pressure is maintained in the chamber 26, but upon relief of pressure from the chamber 26 as through the passage 33 and conduit 15 past the exhaust valve 20 of the thermostat, the said valve 31 will be moved away from its seat under the influence of spring 34, which spring exerts a constant tendency to so move the said valve.

The mechanism so far described comprises means for admitting and exhausting motive fluid to and from the chamber 26 through the thermostat only, but I have provided auxiliary valve means for admitting and exhausting motive fluid to and from the said chamber in an inlet valve 35 and an exhaust valve 36 operated by the motor 12 itself. The valve 35 comprises a valve piece 36' fitted for engagement with a valve seat 37 controlling admission from a passage 38 in connection through a pipe 39 with the main source of supply 14. A branch passage 40 leads from the valve chamber 41 of the valve 35 to the chamber 26. The valve piece 36' is provided with a stem 42 and an abutment 43 at the outer end, a spring 44 surrounding the said stem and bearing between the said abutment 43 and a stationary portion of the device. A diaphragm 45 operates to prevent the escape of motive fluid from the chamber 41 to the atmosphere. The spring 44 normally tends to force the valve piece 36' away from its seat, and the pressure of the motive fluid acts in the same direction, but the said valve piece 36' is normally forced to its seat by means of a lever 46, which engages the abutment 43, the said lever being pivoted at 47 to a part of the frame of the motor, and spring pressed by means of a spring 48. This spring which is constructed so as to exert a very great deal more pressure upon the valve piece 36' than the combined opposing pressures of the light spring 44 and that of the motive fluid against the face of the said valve piece 36'. The lever 46 is provided with an arm 49, which carries at its end a detent 50. This detent 50 is arranged in the path of a cam, constructed in the form of a flange 51, which is carried by the stem 30 and abutment 29. When the motor commences to operate to close the valve 31, and the stem 30 and abutment 29 hence move downward, the flange 51 will upon the first said movement engage the detent 50 so as to move the lever 46 from engagement with the abutment 43, whereby the spring 44 and pressure of the motive fluid will be permitted to act to open the valve 36' to admit motive fluid directly from the passage 38 to the chamber 26.

The capacity of the valve 36' and ports and passages thereto and therefrom, may readily be very much greater than that of the thermostatically controlled valves and ports and passages therefrom, so that, after the motor 12 has commenced to operate under the influence of the thermostat, a large quantity of motive fluid will be quickly admitted to the chamber thereof to quickly cause the completion of the operative movement thereof in the direction in which it is started. Thus, directly the valve 31 commences its closing movement, the said closing movement will be quickly and positively completed. The parts are so constructed and arranged that the valve piece 36' will be held open so as to supply motive fluid directly from the main source of supply until the valve 31 is entirely closed, and, in order to compel the complete closing of the valve 31 before the valve 36' is again permitted to close, I have provided a means for permitting a slight overthrow movement of the motor after the valve 31 has come to its seat, such means comprising a stiff spring 52 inclosed within the housing 53 formed as an extension of the abutment 29, the said spring bearing at one end against the said abutment, and at the other end against a collar 54 fast upon the said stem 30. The spring 52 is arranged to be very much stronger than the spring 34, and, indeed, is arranged to exert a pressure greater than the combined pressures of the spring 34 and that of the motive fluid against the face of the valve 31 when the same is shut. The air pressure in the fluid pressure motor is, however, abundantly sufficient to compress the spring 52 after the valve 31 has been closed, a play of, say, one eighth of an inch more or less being allowed before the abutment 29 finally rests upon the extreme upper end of the stem 30. During this overthrow movement, which is of course lost movement so far as any movement of the valve 31 is concerned, the arm 49 will be released from engagement of its detent 50 with the flange 51, and will be allowed to return to its normal position under the influence of the spring 48. This release takes place by reason of the arc which the arm 49 describes about the center 47, said arc causing the detent 50 to gradually withdraw from the flange 51, as is illustrated by dotted lines in Fig. 3 of the drawings. Directly the arm 49, and hence the lever 46 is released, the said lever 46 will be again caused to engage the abutment 43 to close the valve piece 36'. The valve 31 is now tightly closed and will remain closed so long as there is sufficient fluid pressure in the chamber 26. When the chamber 26 is relieved of its fluid pressure, the abutment 29, stem 30 and valve 31 will be returned to the position in which they are shown in Fig. 3 of the drawings under the influence of the spring 34. During the latter part of this movement the flange 51 will reëngage the detent 50 of the arm 49, but the said detent will now merely yield, moving inwardly in the arm 49 against the pressure of the spring 55, the said movement in no way affecting any movement of the arm 49. After the flange 51 has passed by the detent 50, the detent will snap forward so as to be ready to be operatively engaged by the said flange when it again moves in a downward direction. In moving downward, however, the flange 51 will, near the completion of its said downward movement, engage another detent 56, similarly mounted in an arm 57 pivoted at 58 upon the frame of the motor, said detent 56 being, however, permitted to yield upon the engagement of the flange 51 therewith on its downward movement, but adapted to be operatively engaged thereby upon the upward movement of the same. The arm 57 has secured thereto a lever 59 which carries an exhaust valve 60 arranged to open and close a passage 61 which leads to the chamber 26.

Upon the first upward movement of the parts carrying the flange 51, the valve 60 will be opened so as to open the passage 61 to the atmosphere, and this opening of the valve 60 will take place before the valve 31 has left its seat, because it will be during the taking up of the excess movement which was permitted by the spring 52. The valve 60 in thus opening the auxiliary discharge 61 to atmosphere will permit fluid under pressure to be rapidly exhausted from the chamber 26, so that directly the motor commences to move upward to open the valve 31, it will be immediately compelled to move the whole distance in that direction. Thus, directly there is any tendency to open the valve 31 in the slightest degree, the said valve will be immediately opened wide, and there will be no opportunity for opening the valve slowly or of holding the valve in an intermediate position. The arm 57 will be released when the parts carrying the flange 51 reach their uppermost position, so as to again close the exhaust valve 60 when the valve 31 is wide open, the parts then being in the position shown in Fig. 3, and the motor ready for another operative downward movement, the said flange 51 having not only released the arm 57, but having passed the detent 50 carried by the arm 49 as above explained.

From the foregoing it will be seen that any rest position of the valve 31 other than wide open or entirely closed will be impossible, for, once the thermostat has so operated as to start the motor in one direction, the auxiliary valve mechanism will either operate to quickly admit a large quantity of motive fluid thereto to complete the movement rapidly in one direction, or to quickly exhaust the motive fluid therefrom to compel the rapid movement of the motor in the other direction, in accordance with which direction the thermostatic means first gave initial movement to the motor. The control, then, of the motor will be entirely with the thermostat, and the said motor will quickly respond to the action of the thermostat, but the said motor, though directly controlled from the thermostat, does not depend upon the thermostat for anything but merely its initial movement, the remaining movement being a movement of compulsion due to the auxiliary valve mechanism, for the operation of which the main motor itself supplies abundant power.

It may be here noted that many of the benefits of my invention will be obtained by employing only one of the auxiliary valves, as, for instance, in the arrangement and construction shown in Fig. 3, the exhaust valve. This is for the reason that it is ordinarily not so important to close the main valve quickly as it is to open it quickly. After a radiator, or other part of the heating system to which the controlling valve leads, is heated up, but little harm attaches to the admitting of a small quantity of steam at a time thereto; it is when the radiator is cold that harm results from thus admitting a small quantity of steam at a time, as particularly set forth at the beginning of this specification. If, then, the auxiliary exhaust valve 36 be employed, so that upon the first movement of the motor to open the main valve, fluid pressure will be quickly relieved in said motor to cause the rapid completion of the movement thereof, the said main valve will be compelled to open quickly, and to so open to its widest extent, and the partial closing thereof at a later period will not be serious.

Figure 5:
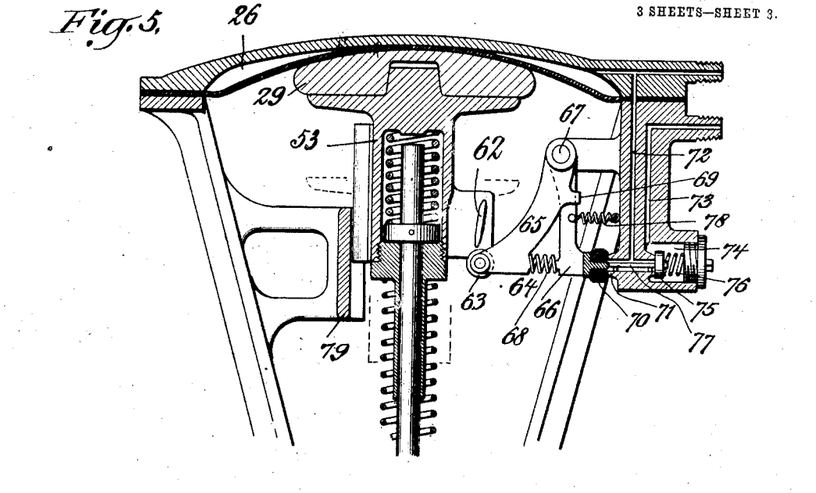
Fig. 5 is a detail view in central vertical section of the main valve motor, with a modified form and construction of supplemental valve mechanism.

In Fig. 5 I have shown a modified form of valve mechanism, in which the admission and exhaust valves of the auxiliary valve mechanism are operated by the same lever, a cam 62 of another type being employed in place of the flange 51. This cam is arranged to engage a cam follower 63 carried by a lever 64, said lever comprising two arms 65, 66, pivoted to a stationary support at 67, said arms pressed apart by means of a spring 68 for a distance limited by a stop 69. The arm 66 of the lever 64 carries a valve 70, which is preferably of soft rubber or some yielding material, said valve engaging a valve seat 71, which communicates with a passage 72 leading to the motor chamber 26. Motive fluid is supplied to the auxiliary valve mechanism through a channel 73 to a valve chamber 74, said valve chamber containing an inlet valve 75 pressed to its seat by means of a spring 76. A pin 77 extends between the valve 75 and the arm 66 of the lever 64, said pin being of such a length to just permit the valve 75 to be seated at the same time as the valve 70 is seated, the valve 70 being, however, under but little compression at the time. A spring 78 exerts tension upon the lever 64 to hold the valve 70 to its seat, but movement of the valve 75 away from its seat is normally opposed by means of the spring 76 and also by the pressure of the motive fluid itself. When the motor operates to close the main valve, the cam 62 moves downward, and, engaging the cam follower 63, immediately swings the lever 64 over so as to compress the valve 70 and open the valve 75. The spring 68 between the two arms 65 and 66 is designed to be considerably stronger than the spring 76 so as to properly insure the desired movement. Directly this takes place motive fluid will rush in through the channel 73 and passage 72 to the motor chamber 26 to enforce rapid and complete downward movement of the main valve to a closing position. When the main valve has completely closed the cam 62 will have moved to a position beyond the follower roller 63, to a position immediately beneath same, whereby, upon its upward movement, it will again engage the said follower roller 63, but upon the opposite side thereof. The spring 68 will, during the said downward movement, take up any excess movement of the lever 64 imparted thereto by the cam 62, by permitting a limited relative movement between the arms 65 and 66. With the parts in their downward rest position, that is, with the valve 31 completely closed, the auxiliary valve mechanism will be again in the normal position in which it is shown in Fig. 5, but, upon the first upward movement of the motor, the cam 62 will engage the follower roller 63 at the rear thereof, and will swing the lever 64 outward so as to open the exhaust valve 70. This will quickly vent the fluid under pressure from the chamber 26, and the motor will complete its upward movement quickly until the parts are again restored to the position shown in Fig. 5. During the upward movement of the cam 62 excess of movement of the lever 64 will be unimportant, as it is immaterial how far the valve 70 is moved away from its seat. During all this time the valve 75 will remain closed to its seat, and it will be understood that the pin or stem 77 is merely in abutting relation with the arm 66. In the illustration of this construction, I have shown a guide 79 for the housing or head 53 which carries the cam 62.

Figure 6:
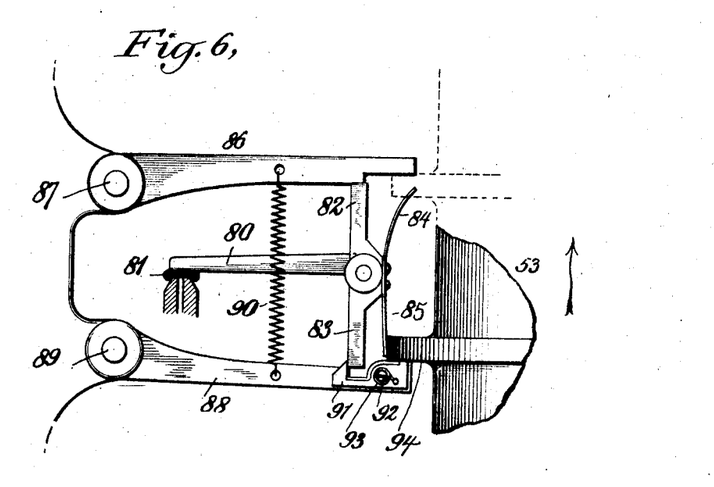
Fig. 6 is a similar view showing a further modification.

In Fig. 6 I have shown somewhat diagrammatically a modified form of valve operating mechanism, which may be employed for either the inlet or exhaust valves, or both. Said mechanism comprises an arm 80 carrying the valve 81, said arm having upwardly and downwardly extending branches 82 and 83. The arm is also provided with a flat spring comprising a portion 84 extending in front of the branch 82, and a portion 85 extending in front of the branch 83. A latch 86, pivoted at 87, is arranged adjacent the upper end of the branch 82, and a similar latch 88, pivoted at 89, is arranged adjacent the lower end of the branch 83. A spring 90 tends to draw the two said latches together. The free end of the latch 88 carries a detent 91, which is pivoted thereto at 92, said latch being normally spring-pressed by a spring 93 in a direction to disengage the end of the branch 83. The parts are shown in Fig. 6 with the motor in its extreme position in one direction, the main valve being similarly at the limit of its movement in such direction. With the parts in such position, the valve 81 is closed upon its seat, the latch 88 having been moved to a position just clear of the branch 83 by means of a projection 94 which is carried by the head 53 but not clear of the detent 91. The said branch is therefore still retained in a position to hold the valve 81 upon its seat by means of the said latch 91. The projection 94 presses against the spring 85, so as to exert a pressure to move the valve 81 from its seat, and will so move it directly the said branch is free of both the latch 88 and the detent 91. This freedom will take place directly the part 94 commences its movement in the direction of the arrow, for immediately upon the commencement of said movement, the detent 91 will be released and will swing over under the influence of this spring 93 to release the branch 83. Directly the branch 83 is released, the valve 81 will be opened, and will then be held open by reason of the fact that the upper branch 82 will be caught by the latch 86. During the continuance of the said movement of the part 94 the valve 81 will remain open, the projection 94, however, exerting force upon the spring 84 to store power therein to finally close same until finally as the motor approaches the completion of its movement, the part 94 will engage the latch 86 to trip same, when the power stored up in the spring 84 will throw the lever 80 over so as to close the valve 81, the lower branch 83 at such time being caught by the latch 88 and detent 91. Said valve 81 will now be held in its closed position until the motor has again moved to the position shown in the drawings and has again commenced its return movement in the direction of the arrow. The valve 81 will represent the exhaust valve if the parts are applied to a motor arranged as is the motor of Fig. 3, because it is during the upward movement of the motor that the said exhaust valve is desired to be in an open condition. With an exact reversal of the parts, the said valve 81 may represent the inlet valve, as will be well understood.

While my invention is particularly adapted to use with steam valves, it may also be applied to valves of the type known as dampers, hence where I employ the term main or primary valve in the claims, I intend same to equally apply to dampers and other forms of valves as it does to steam valves of the type shown.

What I claim is:

1. Regulating apparatus comprising a main valve, a fluid pressure motor therefor, the said motor provided with an auxiliary port or passage, thermostatically controlled means for the said motor, a secondary valve for the said auxiliary port or passage, a spring detent mounted to move bodily with the said valve, but having an independent yielding movement with respect thereto, and an abutment carried by the said motor arranged, in the movements thereof, to engage the said detent, and to trip same when moving in one direction.

2. Regulating apparatus comprising a main valve, a fluid pressure motor therefor, the said motor provided with an auxiliary port or passage, thermostatically controlled means for the said motor, a secondary valve for the auxiliary port or passage, a member carrying the said valve, mounted in a portion stationary with respect to the moving parts of the said motor, and a projection carried by the moving parts of the said motor, arranged, in the movement thereof, to engage the said valve carrying member.

3. Regulating apparatus comprising a main valve, a fluid pressure motor therefor, the said motor having an auxiliary port or passage and provided with a valve seat in a stationary part thereof connecting the said port or passage, thermostatically controlled means for the said motor, a valve fitted to the said valve seat, a member carrying the said valve, mounted in a stationary portion of the said motor, and a projection carried by a moving portion of the said motor, adapted in the movement thereof to engage and operate the said valve carrying member.

4. Regulating apparatus comprising a main valve, a fluid pressure motor therefor, the said motor having an auxiliary port or passage and provided with a valve seat in a stationary portion thereof connecting with the said port or passage, thermostatically controlled means for the said motor, a secondary valve fitted to the said valve seat, a member carrying the said valve and mounted in a portion stationary with the motor, a spring actuated detent carried by the said member, and a projection carried by a moving portion of the motor, arranged in the movement thereof, to engage the said detent.

5. Regulating apparatus comprising a main valve, a fluid pressure motor therefor, the said fluid pressure motor provided with an auxiliary discharge passage, thermostatically controlled means for motive fluid supplied to the said motor, an auxiliary valve for the said auxiliary discharge passage, a pivoted lever carrying the said valve, and a projection carried by a moving portion of the motor, adapted, in its movement, to engage the said lever and to operate the said valve.

6. Regulating apparatus comprising a main valve, a fluid pressure motor therefor, the said motor having an auxiliary port and provided with a stationary valve seat connecting with the said passage, thermostatically controlled means for the said motor, a valve fitted to the said valve seat, a member carrying the said valve mounted in a stationary portion of the said motor, and a projection carried by a moving portion of the said motor, arranged, in its movement, to operate the said member.

7. Regulating apparatus comprising a main valve, a fluid pressure motor therefor arranged to open and close the said valve by movements in opposite directions, thermostatically controlled means for admitting motive fluid to start the operation of fluid pressure motor in one direction, and means for introducing an auxiliary supply of motive fluid, after the motor has been started to move, the said means being controlled in its operation by movements of the fluid pressure motor itself.

8. Regulating apparatus comprising a main valve, a fluid pressure motor therefor, thermostatically controlled means for starting the operation of the fluid pressure motor in one direction, valve controlled means for admitting an auxiliary independent supply of motive fluid to the fluid pressure motor, the said valve means being operated by the fluid pressure motor itself, in its initial movement, to open the said auxiliary supply and thereby to enforce the immediate completion of movement of the said fluid pressure motor after the said thermostatically controlled means has started the operation thereof and regardless of the quantity of motive fluid admitted to the fluid pressure motor by the said thermostatically controlled means subsequent to the said initial movement of the motor.

9. Regulating apparatus comprising a primary valve, a fluid pressure motor therefor, a secondary valve controlling an independent port or passage communicating with the said fluid pressure motor and with a main source of supply, the said valve also operated by the said pressure motor, a tertiary valve and thermostatically controlled means for operating the said tertiary valve.

10. Regulating apparatus comprising a main valve, a fluid pressure motor therefor, thermostatically controlled means in direct connection with said fluid pressure motor, and auxiliary inlet and exhaust valves for the said fluid pressure motor operated by the said fluid pressure motor itself.

11. Regulating apparatus comprising a main valve, a fluid pressure motor therefor, thermostatically controlled means in direct connection with the fluid pressure motor, and an auxiliary inlet valve for the said fluid pressure motor, also operated by the said fluid pressure motor itself in its movements.

12. Regulating apparatus comprising a main valve, a fluid pressure motor therefor, thermostatically controlled means for motive fluid supplied to the said motor, an auxiliary inlet passage from the source of supply to said motor, a valve for said passage, and means carried by said motor for operating said valve when moving in one direction.

13. Regulating apparatus comprising a main valve, a fluid pressure motor therefor, thermostatically controlled means for motive fluid supplied to the said motor, an auxiliary passage communicating with said motor, a valve for said passage, means carried by a moving portion of the said motor for operating said valve when moving in one direction, and yielding means whereby the said valve will not be operated when the motor is moving in the other direction, said yielding means carried with the said valve, and engaged by the motor carried operating means.

14. Regulating apparatus comprising a main valve, a fluid pressure motor therefor, thermostatically controlled means for said motor, an auxiliary port or passage in communication with said motor, a secondary valve therefor, a pivoted lever carrying said valve, a spring detent carried by said lever, and an abutment carried by the motor arranged to engage said detent, substantially as specified.

15. Regulating apparatus comprising a main valve, a fluid pressure motor therefor, thermostatically controlled means for starting the operation of the fluid pressure motor in one direction, auxiliary valve means for the fluid pressure motor arranged to be closed in the limits of movement of the motor in either direction, and means operated by the motor itself to engage and operate the said valve means during the movement of the said motor in either direction whereby enforcing the rapid completion of the movement of the said motor in either direction in which it has started to move.

16. Regulating apparatus comprising a main valve, a fluid pressure motor therefor, thermostatically controlled means for said fluid pressure motor, a supplemental inlet for said motor, a supplemental exhaust therefor, valves for said inlet and exhaust, and means operated by said motor in its movements for opening one of said valves when moving in one direction, and the other of said valves when moving in the other direction.

17. Regulating apparatus comprising a main valve, a fluid pressure motor therefor, thermostatically controlled means for said fluid pressure motor, a supplemental inlet for said motor, a supplemental exhaust therefor, valves for said inlet and exhaust, and means operated by said motor in its movements for opening one of said valves when moving in one direction, and the other of said valves when moving in the other direction, both of said valves being in normal closed positions when the motor is in the limit of its movement in either direction.

18. Regulating apparatus comprising a main valve, a fluid pressure motor therefor, thermostatically controlled means for said motor, an auxiliary port or passage in communication with said motor, a secondary valve therefor, a pivoted lever carrying said valve, a spring detent carried by said lever, an abutment carried by the motor arranged to engage said detent, and yielding means permitting slight overthrow movements of the motor after the said main valve has been closed thereby.

19. Regulating apparatus comprising a main valve, a fluid pressure motor therefor, thermostatically controlled means for said fluid pressure motor, a supplemental inlet for said motor, a supplemental exhaust therefor, valve means for said inlet and exhaust, means operated by said motor in its movements for opening one of said valves when moving in one direction and the other of said valves when moving in the other direction, and yielding means permitting slight overthrow movements of the motor after the said main valve has been closed thereby.

20. Regulating apparatus comprising a main valve, a thermostatically controlled fluid pressure motor therefor, secondary valve mechanism for said fluid pressure motor, means carried by said motor for operating said valve mechanism when moving in one direction, but for passing same when moving in the other direction, and a yielding spring connection between the motor and the main valve permitting overthrow movements of the said motor in the direction of closing of the said main valve, whereby the said motor may move to a position beyond the said valve mechanism after the said main valve has been closed, and upon a return movement will commence to operate the said valve mechanism before the said main valve has opened.

21. Regulating apparatus comprising a main valve, a thermostatically controlled fluid pressure motor therefor, said motor having an abutment comprising a movable wall, and said valve provided with a stem engaged by said abutment, a spring tending to move said fluid pressure motor and valve in one direction, a stronger spring between the abutment and the stem tending to move the said stem in the other direction, a limiting stop between the said stem and the said abutment limiting the movement of the said stem under the influence of the last said spring, said stem also being limited in its movement in the other direction by engagement with said abutment, and secondary valve means for said fluid pressure motor operated by the fluid pressure motor in its movements.

22. Regulating apparatus comprising a main valve, a thermostatically controlled fluid pressure motor therefor, said motor having an abutment comprising a movable wall, and the said valve provided with a stem adapted to be operated by the said abutment, a spring arranged to operate directly against the said abutment to cause the fluid pressure motor to move in one direction, a stronger spring between the abutment and the valve stem, a limiting stop between the stem and the abutment limiting the relative movement of the stem and abutment under the influence of the said stronger spring, and secondary valve means for the motive fluid, operated by the fluid pressure motor in its movements.

23. Regulating apparatus comprising a main valve provided with a stem, a thermostatically controlled fluid pressure motor provided with a movable wall including an abutment and a housing carried thereby, the said housing loosely engaging the said valve stem, a spring engaging the said movable wall and constantly exerting pressure to move the same in one direction, a collar upon the valve stem and engaged by the said housing whereby the movements of the movable wall, under the influence of the said spring, will be imparted to the said spring, a stronger spring between the collar upon the valve stem and the movable wall exerting pressure to move the said valve stem in the opposite direction, and secondary valve means for the motive fluid, operated by the fluid pressure motor in its movements.

D. HOWARD HAYWOOD.

Witnesses:
 LYMAN S. ANDREWS, Jr.,
 C. F. CARRINGTON.